United States Patent [19]

Holmes

[11] 4,076,064
[45] Feb. 28, 1978

[54] LOCKING THREAD CONSTRUCTION

[76] Inventor: Horace D. Holmes, 28576 Green Willow, Farmington Hills, Mich. 48018

[21] Appl. No.: 755,437

[22] Filed: Dec. 29, 1976

Related U.S. Application Data

[63] Continuation of Ser. No. 620,566, Oct. 8, 1975, abandoned.

[51] Int. Cl.² .............................................. F16B 39/30
[52] U.S. Cl. .................................... 151/14 R; 85/46; 151/22
[58] Field of Search ................... 151/14 R, 22; 85/46, 85/47, 48, 32 T

[56] References Cited

U.S. PATENT DOCUMENTS

| | | | |
|---|---|---|---|
| 1,697,118 | 1/1929 | Hoke | 151/14 R |
| 1,798,604 | 3/1931 | Hoke | 151/14 R |
| 1,828,856 | 10/1931 | Bridges | 151/14 R |
| 2,091,788 | 8/1937 | McManus | 151/14 R |

FOREIGN PATENT DOCUMENTS

| | | | |
|---|---|---|---|
| 335,598 | 9/1930 | United Kingdom | 151/14 R |
| 337,675 | 11/1930 | United Kingdom | 151/14 R |

Primary Examiner—Roy D. Frazier
Assistant Examiner—Rodney H. Bonck
Attorney, Agent, or Firm—Krass & Young

[57] ABSTRACT

A locking thread design which may be incorporated in various types of male and female threaded elements, for example, a bolt and nut, or a bolt and casting, forging or similar member having a threaded bore therein. The thread design is of the reversed buttress type and is free running until a predetermined magnitude of loading is applied thereto, at which time the locking action of the thread occurs so as to prevent relative lateral movement between the nut and bolt and hence positively resist loosening thereof under vibration and similar adverse operating conditions.

9 Claims, 8 Drawing Figures

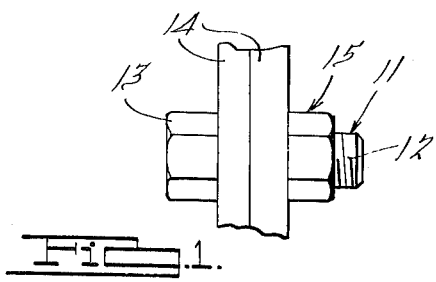
Fig. 1.
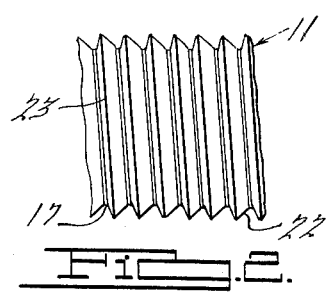
Fig. 2.
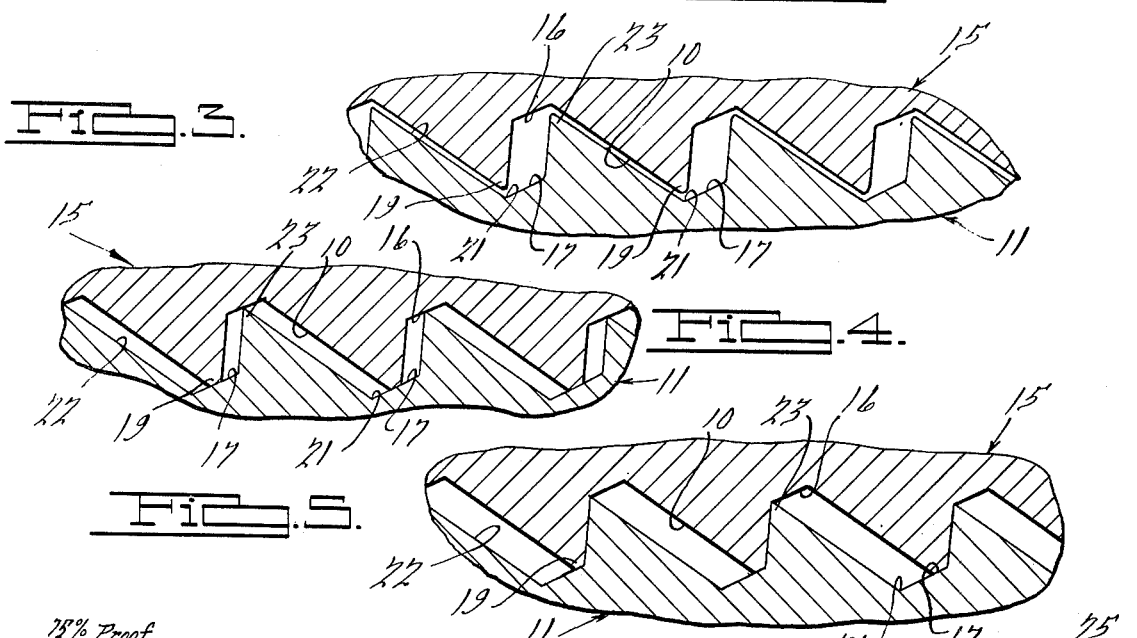
Fig. 3.
Fig. 4.
Fig. 5.
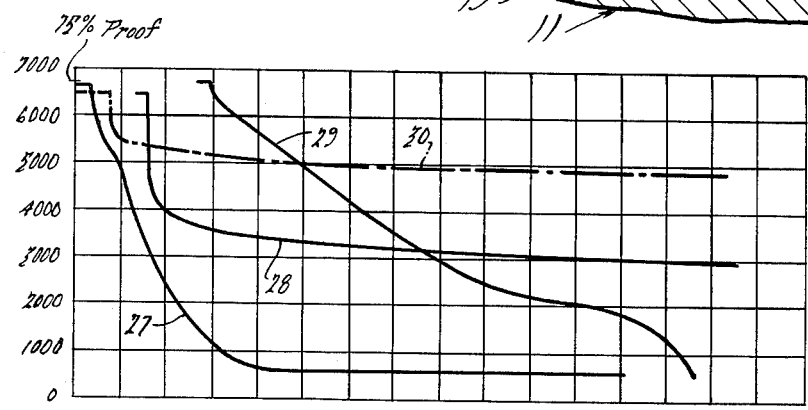
Fig. 8.
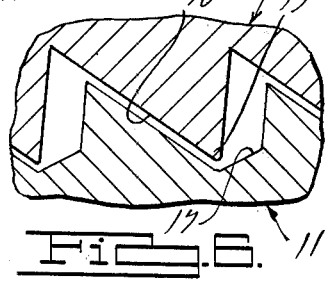
Fig. 6.
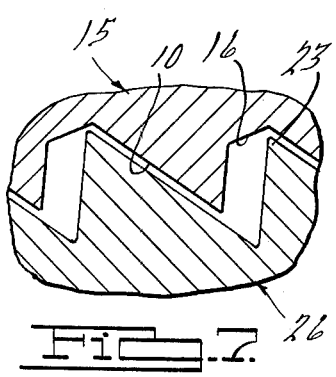
Fig. 7.

LOCKING THREAD CONSTRUCTION

REFERENCE TO RELATED APPLICATION

This is a continuation application of U.S. Ser. No. 620,566 filed Oct. 8, 1975, for LOCKING THREAD CONSTRUCTION, now abandoned.

BACKGROUND OF THE INVENTION

A search has disclosed various types of locking thread designs wherein a binding pressure is provided between the threads of male and female elements to produce a positive lock. Such prior art designs, for example, are shown in U.S. Pat. Nos. 1,657,244; 1,697,118; 1,798,604; 1,817,295; and 1,828,856 and in French Pat. No. 40,199 of 1932. These prior art locking thread designs are believed to operate satisfactorily in theory, but from a practical and commercial standpoint, are unacceptable due to the tolerance limitations under which modern thread forming equipment must operate. The locking thread design of the present invention, on the other hand, may be readily formed with conveniently available equipment and in accordance with current tolerance limitations, and more importantly, provides for a locking action between the threaded elements that is at least as good as, if not superior to, the locking performance of the aforesaid prior art locking thread designs.

SUMMARY OF THE INVENTION

The locking thread design of the present invention is illustrated, by way of example, as embodied on a nut and bolt which are employed to clamp a pair of elements in tight secured engagement with each other. The thead design is generally of the buttress type which is provided with a flat area or ramp at the thread root of either or both of the bolt and nut threads. The ramp at the thread root on the bolt is disposed at an angle of approximately 30° from the bolt's axis, while the ramp at the thread root of the nut is disposed at an angle of approximately 22-½° to the nut axis. The purpose of the angles at the thread roots is to allow the threads to be manufactured to normal commercial tolerances and still always make contact with the crown of the mating thread and thereby prevent lateral movement between the threaded members and thus prevent loosening under vibration or other adverse conditions. It is to be noted that the aforesaid angles apply particularly when the nut (female element) is fabricated of a relatively softer material than the bolt or male element, and that the angles may be the same or relatively larger or smaller on the male and female elements depending upon the relative degree of hardness of the materials from which these elements are formed.

The thread design of the present invention is free running under non-loaded or lightly loaded conditions; however, at such time as the degree of loading reaches a predetermined magnitude, the thread crown or crowns move into contact with the ramp or ramps of the opposing threaded element. Under such locking conditions, the crown of the softer thread (usually of the nut) will become relatively deformed, with an increase in magnitude of the clamping pressure applied between the bolt and nut on the two assembled elements causing a corresponding increase in the amount of deformation of the threads and hence a greater degree of contact between the threaded elements. Complete tightening of the nut on the bolt results in full engagement of the thread faces which occurs, for example, when an approximately 90 foot-pounds force is applied to a one-half (½) inch diameter bolt, with various other forces being applicable to different size bolts and nuts.

BRIEF DESCRIPTION OF THE DRAWINGS

FIG. 1 is a view in elevation of a bolt clamping two elements together on a thread embodying features of the present invention;

FIG. 2 is an enlarged broken view of the bolt thread illustrated in FIG. 1;

FIG. 3 is an enlarged broken sectional view of the thread of the nut and bolt when in free-running relation to each other;

FIG. 4 is a view of the structure illustrated in FIG. 3 after the bolt has clamped the two elements illustrated in FIG. 1, with a minimum of holding force;

FIG. 5 is a view of the structure illustrated in FIG. 4, when a substantial pressure has been applied on the nut to cause the thread of the nut to advance to the right until thread engagement occurs;

FIG. 6 is a view of structure, similar to that illustrated in FIG. 3, with only the bolt having the root of the thread provided with a sloping surface;

FIG. 7 is a view of structure, similar to that illustrated in FIG. 6, with only the nut having the root of its thread provided with a flat surface; and FIG. 8 is a view of a chart showing the substantial holding force provided by the thread structure herein illustrated and described.

DESCRIPTION OF THE PREFERRED EMBODIMENT

A bolt or male threaded element 11 has a shank portion at one end thereof which is formed with a thread 12, with an enlarged head 13 being provided at the opposite end from the thread 12. The bolt, as illustrated in FIG. 1, extends through a pair of elements 14 which are to be clamped together by a nut or female threaded element 15 having an internal thread 10 which is normally freely running on the thread 12 of the bolt. The bolt 11 is preferably, although not necessarily, constructed from a hardenable steel, such as 1335, 1441 or 1340, while the nut 15 is constructed from a relatively softer or more deformable steel than the bolt 11, such as 1008 or 1010. It is to be understood that the bolt could also be constructed from a soft steel but is preferably constructed of a hardenable steel. In the present arrangement, the threads 10 and 12 are of the buttress type having one flank of substantial angle while the other flank has a very small angle relative to the axis of the bolt or nut. As illustrated in FIGS. 2-5 inclusive, the thread of both the bolt 11 and nut 15 has the root flattened in a manner to provide a flat surface or ramp which slopes relative to the thread axis; the flat 16 at the root of the nut 15 is disposed at an angle of approximately 22-½° relative to the thread axis, while the flat 17 at the root of the bolt thread 12 is disposed at an angle of approximately 30° from the exis of the thread.

It is to be noted that the aforesaid angles will vary with the degree of hardness of the material from which the bolt 11 and nut 15 are fabricated, and that when these elements are fabricated so as to be of similar or identical hardness, the angles of the flats or ramps 16 and 17 are preferably equal or approximately equal.

When the nut 15 is in the position illustrated in FIG. 3 with the crown 19 of its thread 10 disposed adjacent to the corner 21 of the bolt 11 between the flat surface 17 and the sloping face 22, the nut 15 is free running on the thread 12 and is freely rotatable toward the left until the nut 15 strikes the adjacent element 14, whereupon the continued rotation of the nut 15 will cause the crowns 19 and flat 16 to move to the right engaging the flat sloping surface 17 and crown 23, respectively, and causing the softer metal of the crown 19 to deform. In FIG. 4, the crown 23 is illustrated as contacting the sloping flat 16 of the nut 15, as would occur when an approximately 50 foot-pound force is exerted on a one-half inch bolt, thereby providing a substantial degree of contact between the threads which locks the nut 15 in position along the bolt shank. When an increased torsional force is applied to the nut 15, an even greater degree of contact will occur between the ramps 16, 17 and the crowns 19, 23 until the faces of the nut thread engages the faces of the bolt thread, as shown in FIG. 5, which would occur, for example, when a one-half inch bolt is subjected to a 90 foot-pound load. This provides an even greater degree of contact between the crowns 19 and 23 and the flat sloping surfaces 17 and 16, and under these conditions, any relative lateral movement between the nut 15 and bolt 11 is positively prevented so as to assure against loosening thereof, which locked condition will exist until such time as a positive force is applied to unscrew the nut thread 10 from the thread 12 of the bolt 11 and thereby cause the respective threads to reach the position illustrated in FIG. 3, whereupon the nut 15 is again free running toward the end of the bolt thread 12.

Referring to FIG. 6, the bolt 11 is the same as the bolt above described with regard to FIGS. 1–5 while the nut 25 has no flat areas 16 in the thread root thereof. As a result, the crown 19 of the nut will contact the flat sloping surface 17 at the root ot the bolt to provide the locking of the nut on the bolt when sufficient pressure has been applied to the nut after the elements 14 have been clamped together.

A similar result is obtained when the relationship of the threads is that illustrated in FIG. 7. In this arrangement, the thread 10 of the nut 15 has the flat 16 thereon while bolt 26 has no flat in the root area. When the nut is subjected to a predetermined degree of axial loading, such as when it is being tightened against the element 14, further rotation of the nut 15 will cause the crown 23 of the bolt thread to contact flat surface 16 of the nut thread 10, thereby producing distortion or penetration of the ramp 16 of the soft nut metal to a degree commensurate with the amount of pressure (torque) which is applied to clamp the element 14. When a substantial pressure is applied, the faces of the nut thread will advance into engagement with the facing surfaces of the thread of the bolt 26, as described above. In any of the examples herein illustrated, it will be noted that the engagement of the crowns of one or both threads with the sloping ramp or ramps at the roots of the opposing threads will produce the deformation or distortion of the soft metal of the nut or both the nut and bolt, with the result that no lateral movement between the nut and bolt will occur, which in turn assures against loosening of the bolt and nut after assembly thereof.

The chart or graph of FIG. 8 shows the result of the same test made on four different nut and bolt combinations on a Junkers testing machine which vibrates the tightened nut and bolt supported thereon. The first graph line 27 represents a test performed on a standard type of bolt and nut having a 7/16 inch diameter after it was drawn up to approximately 7,000 pounds axial force. The shaking of this bolt and nut rapidly loosened the nut and the holding force quickly decreased to below 100 pounds. Each square represents approximately two seconds of time so that this test occurred in practically ten seconds. The graph line 28 represents a test run on a 7/16 inch nut and bolt of the present invention in which it will be noted that under a clamping force of 6,500 pounds the vibration caused an initial slight loosening of the nut, but which thereafter maintained a clamping force of between approximately three and four thousand pounds. The third graph line 29 was the result of a test on a 7/16 inch prior art type lock nut and associated bolt, the lock nut being oval, triangular or other shape, and in this test a rapid drop from the 6,500 pounds applied force continued on to the bottom of the chart. Graph line 30 discloses a subsequent or second test of the identical nut and bolt tested in connection with the graph line 28 and illustrates the fact that the superior locking characteristics of the present invention are not lessened even during reuse of the nut and bolt. The reason that the bolt and nut lessened to a greater degree during the original test depicted by line 28, as compared to the "reuse" test depicted by line 30, is believed to be attributed to a protective coating on the nut and bolt elements which caused an artificially low reading of the original test data.

While it will be apparent that the embodiments illustrated herein are well calculated to fulfill the objects above stated, it will be appreciated that the present invention is susceptible to modification, variation and change without departing from the proper scope or fair meaning of the subjoined claims.

The embodiments of the invention in which an exclusive property or privilege is claimed are defined as follows:

1. A fastener combination comprising a threaded male element and a threaded female element adapted to receive the male element in threaded engagement therewith;
   each of the male and female threaded elements having a thread form thereon defined by leading and trailing helical flanks, which intersect to define a crown each flank lying at an angle relative to the common longitudinal thread axis of the fastener combination;
   the female element including a truncated coat adjacent the major diameter thereof, said truncated coat defining a helical flat extending between the trailing flank and the adjacent leading flank which faces said trailing flank, and said flat, throughout its axial extent, lying at an angle between about 20° and 30° relative to the thread axis which is substantially less than the angle of the male element flank which tends to converge on said flat under axial tension load; said flat angled radially outward from said trailing to said adjacent leading flank.
   whereby axial tension loading of the combination tends to displace the crown of the male thread into contact with the flat to prevent movement between the elements transverse to said axis and lock elements.

2. A fastener combination as defined in claim 1 wherein the angles of the respective flanks are unequal such that the thread forms are asymmetric.

3. A fastener combination as defined in claim 1 wherein the male element is a bolt having a gripping head, and the female element is a nut having wrenching surfaces.

4. A fastener combination comprising a threaded male element and a threaded female element adapted to receive the male element in threaded engagement therewith;

each of the male and female threaded elements having a thread form thereon defined by leading and trailing helical flanks, which intersect to define a crown each flank lying at an angle relative to the common longitudinal thread axis of the fastener combination;

one of the elements including a truncated coat defining a helical flat extending between the trailing flank and the adjacent leading flank which faces said trailing flank, and said flat, throughout its axial extent, lying at an angle between about 20° and 30° relative to the thread axis which is substantially less than the angle of the other element flank which tends to converge on said flat under axial tension load; said flat angled radially outward from said trailing to said adjacent leading flank.

whereby axial tension loading of the combination tends to displace the crown of said other thread into contact with the flat to prevent movement between the elements transverse to said axis and lock said elements together.

5. A fastener combination as defined in claim 4 wherein the angles of the respective flanks are unequal such that the thread forms are asymmetric.

6. A fastener combination as defined in claim 4 wherein the male element is a bolt having a gripping head, and the female element is a nut having wrenching surfaces.

7. For use in a fastener combination comprising a threaded male element having a thread form thereon defined by leading and trailing helical, flanks, which intersects to define a crown each flank lying at an angle relative to the common longitudinal thread axis of the fastener combination;

a female threaded element having a thread form defined by leading and trailing helical, intersecting flanks each of which lies at an angle relative to the thread axis thereof;

the female element including a truncated coat adjacent the major diameter thereof said truncated coat defining a helical flat extending between the trailing flank and the adjacent leading flank which faces said trailing flank, and said flat, throughout its axial extent, lying at an angle between about 20° and 30° relative to the thread axis which is substantially less than the angle of the male element flank which tends to converge on said flat under axial tension load, said flat angled radially outward from said trailing to said adjacent leading flank;

whereby, when in the combination, axial tension loading tends to displace the crown of a male thread into contact with the flat to prevent movement between the elements transverse to said axis and lock said elements together.

8. A fastener combination as defined in claim 7 wherein the angles of the respective flanks are unequal such that the thread forms are asymmetric.

9. A fastener combination as defined in claim 7 wherein the male element is a bolt having a gripping head, and the female element is a nut having wrenching surfaces.

* * * * *